US012057732B2

(12) United States Patent
Wang et al.

(10) Patent No.: US 12,057,732 B2
(45) Date of Patent: Aug. 6, 2024

(54) HIGH VOLTAGE DISCHARGE

(71) Applicant: Rivian IP Holdings, LLC, Plymouth, MI (US)

(72) Inventors: Boru Wang, Culver City, CA (US); Chia-Chou Yeh, Torrance, CA (US); Charles John Scanlon, Culver City, CA (US)

(73) Assignee: Rivian IP Holdings, LLC, Irvine, CA (US)

( * ) Notice: Subject to any disclaimer, the term of this patent is extended or adjusted under 35 U.S.C. 154(b) by 117 days.

(21) Appl. No.: 17/931,187

(22) Filed: Sep. 12, 2022

(65) Prior Publication Data

US 2024/0088703 A1   Mar. 14, 2024

(51) Int. Cl.
*H02J 7/00* (2006.01)
*B60L 3/00* (2019.01)
*B60L 50/40* (2019.01)
*H02J 7/04* (2006.01)
*H02J 7/34* (2006.01)
*H02P 27/06* (2006.01)

(52) U.S. Cl.
CPC .............. *H02J 7/04* (2013.01); *B60L 3/0046* (2013.01); *B60L 50/40* (2019.02); *H02J 7/0048* (2020.01); *H02J 7/345* (2013.01); *H02P 27/06* (2013.01)

(58) Field of Classification Search
None
See application file for complete search history.

(56) References Cited

U.S. PATENT DOCUMENTS

| | | | | |
|---|---|---|---|---|
| 2011/0115416 A1* | 5/2011 | Oh | ........................ | H02J 7/345 320/166 |
| 2014/0268953 A1* | 9/2014 | Patel | ..................... | H02M 7/217 363/89 |
| 2022/0360140 A1* | 11/2022 | Zhu | ........................ | H02J 50/001 |
| 2022/0368217 A1* | 11/2022 | Hiruma | ................ | H01M 10/48 |

(Continued)

OTHER PUBLICATIONS

Gong, C., et al., "Winding-Based DC-Bus Capacitor Discharge Technique Selection Principles Based on Parametric Analysis for EV-PMSM Drives in Post-Crash Conditions," IEEE Transactions on Power Electronics, vol. 36, No. 3, pp. 3551-3562, Mar. 2021, DOI: 10.1109/TPEL.2020.3017719.

(Continued)

*Primary Examiner* — Jared Fureman
*Assistant Examiner* — Esayas G Yeshaw
(74) *Attorney, Agent, or Firm* — Foley & Lardner LLP

(57) ABSTRACT

High voltage discharge is provided. A system can include an electric motor of an electric vehicle electrically connected to a capacitor. A switching component can be connected with and intermediary to the electric motor and the capacitor. A controller can cause the switching component to enter a first state to cause the electric motor to convert electrical power of the capacitor to mechanical power to propel the electric vehicle, or convert mechanical power from a drive system of the electric vehicle to electrical power to charge the capacitor. The controller can cause the switching component to enter, in response to detection by the controller of an indication to discharge the capacitor, a second state to isolate the electric motor from the capacitor.

20 Claims, 8 Drawing Sheets

(56) References Cited

U.S. PATENT DOCUMENTS

2023/0087317 A1* 3/2023 Kim .................. G07C 5/0816
                                                                 701/31.7
2023/0302921 A1* 9/2023 Ye ......................... B60L 50/40

OTHER PUBLICATIONS

Ke, Z., et al., "DC Bus Capacitor Discharge of Permanent-Magnet Synchoronous Machine Drive Systems for Hybrid Electric Vehicles," IEEE Transactions on Industry Applications, vol. 53, No. pp. 1399-1405, Mar.-Apr. 2017, DOI: 10.1109/TIA.2016.2636279.

* cited by examiner

HIGH VOLTAGE DISCHARGE

INTRODUCTION

Electric systems, such as electric vehicles, can include a battery that can provide energy to an electric motor.

SUMMARY

This technical solution is generally directed to controlling an electric drive unit to discharge a direct current ("DC") bus to a desired level within a desired time period in a high voltage system that includes components capable of recharging the DC bus. To do so, this technical solution can, for example, alternate the drive unit control between two modes (e.g., a DC bus isolation mode and a current injection mode). This technology can alternate between the modes based on factors associated with the system, such as the speed of the electric motor or vehicle, or the high voltage bus level. By alternating between the two modes, this technical solution can prevent or reduce the likelihood of unexpected DC bus recharge by electric motor or other components in the high voltage system during the DC bus discharge process.

At least one aspect is directed to a system. The system includes a switching component. The switching component can be electrically connected and intermediary to an electric motor of an electric vehicle and a capacitor of the electric vehicle. A controller can cause the switching component to enter a first state to cause the electric motor to convert electrical power of the capacitor to mechanical power to propel the electric vehicle, or convert mechanical power from a drive system of the electric vehicle to electrical power to charge the capacitor. A controller can detect an indication to discharge the capacitor. The switching component can enter, responsive to the detection, a second state to isolate the electric motor from the capacitor.

At least one aspect is directed to a method. The method can be performed by a system. The method can include receiving an indication of a voltage of a capacitor. The method can include comparing the voltage of the capacitor to a threshold. The method can include determining that the threshold exceeds the voltage of the capacitor. The method can include engaging a switching component to switch a propulsion component between a first state and a second state. The propulsion component can, in the first state, convert between electrical and mechanical energy. The propulsion component can, in the second state, convert from electrical or mechanical energy to thermal energy.

At least one aspect is directed to a non-transitory computer readable media. The non-transitory computer readable media can contain instructions that can be executed by a processor of the system. The instructions can include instructions to detect an indication to discharge a capacitor. The instructions can include instructions to detect an indication of a voltage of the capacitor. The instructions can include instructions to compare the voltage of the capacitor to a threshold. The instructions can include instructions to determine whether the threshold exceeds the voltage of the capacitor. Responsive to the determination, the instructions can engage a first switching component to switch a multi-phase AC motor between a first state and a second state. Responsive to the determination, the instructions can inject current into the multi-phase AC motor within a thermal operation envelop upon determining that the voltage does not exceed the threshold. The multi-phase AC motor can convert between electrical and mechanical energy in the first state. A plurality of phases of the multi-phase AC motor can be connected to each other in the second state.

These and other aspects and implementations are discussed in detail below. The foregoing information and the following detailed description include illustrative examples of various aspects and implementations, and provide an overview or framework for understanding the nature and character of the claimed aspects and implementations. The drawings provide illustration and a further understanding of the various aspects and implementations, and are incorporated in and constitute a part of this specification. The foregoing information and the following detailed description and drawings include illustrative examples and should not be considered as limiting.

BRIEF DESCRIPTION OF THE DRAWINGS

The accompanying drawings are not intended to be drawn to scale. Like reference numbers and designations in the various drawings indicate like elements. For purposes of clarity, not every component may be labeled in every drawing. In the drawings.

DETAILED DESCRIPTION

Figure 1:
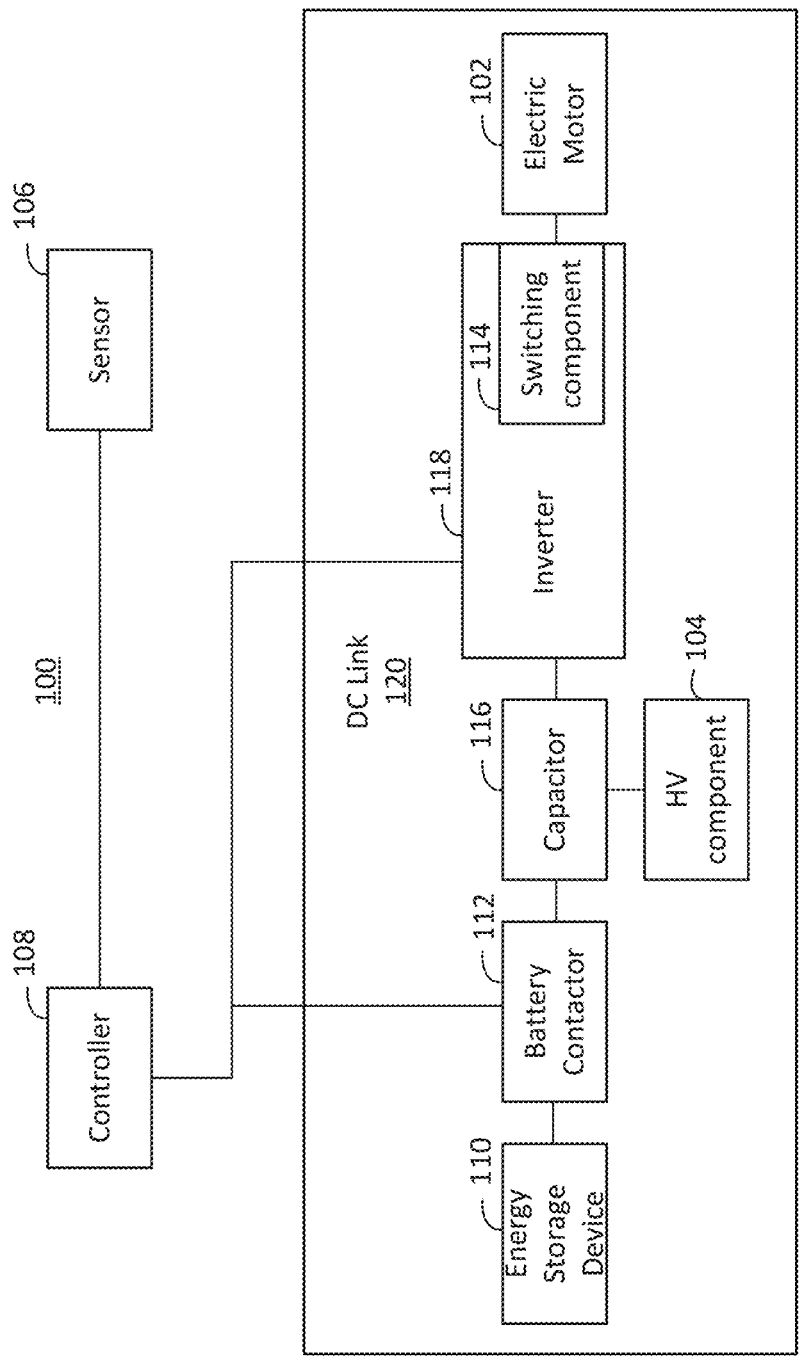
FIG. 1 depicts a block diagram of a system of an electric vehicle, in accordance with some aspects.

Following below are more detailed descriptions of various concepts related to, and implementations of, methods, apparatuses, and systems of high voltage discharge. The various concepts introduced above and discussed in greater detail below may be implemented in any of numerous ways.

This disclosure is generally directed to discharging a bused connection of an electric vehicle (e.g., a DC link or DC bus). For example, an aspect of this technology is directed to controlling the discharge of a DC bus capacitor between two states (or modes) depending on motor speed and high voltage bus voltage level. In the first state, which can be referred to as a DC bus isolation state or a short circuit state, the technology can command a three-phase short to electrically isolate the DC bus from an electric motor or an electric drive unit. In the second state, which can be referred to as a current injection state or an active discharge, the technology can discharge DC bus capacitors to a desired voltage level through drive unit loss regulation. Thus, by alternating between these two states, this technology can prevent the discharge process from being interrupted by non-critical drive unit events, as well as prevent the DC bus from being recharged by motors or other components of the high voltage system.

An electric motor of an electric vehicle can dissipate or convert energy according to various states. For example, the electric motor can convert electrical energy to mechanical (e.g., kinetic) energy to propel the vehicle, or convert mechanical energy to generate electrical energy (e.g., regenerative breaking). The electric motor can dissipate electrical energy as thermal energy. For example, the electric motor can operate in a voltage limited state which does not generate tractive effort to maintain a target DC bus voltage, or circulate current between phases in a short circuit state. The electric motor can dissipate thermal energy to discharge a capacitance of a DC bus. The electric motor can discharge a capacitance based on various vehicle parameters and states. For example, if an electric motor is circulating current between phases (e.g., to maintain a voltage of a DC bus) and receives an indication to discharge a capacitance of a DC bus, the electric motor can continue circulating current between phases to discharge the bus rather than transitioning to another state.

The electric vehicle can include a propulsion component, such as an inverter or motor. The electric vehicle can include non-propulsion electric components such as an on board charger, DC to DC converter, AC compressor, or heat pump. The propulsion and non-propulsion components can be connected to one or more electric buses. The propulsion components (e.g., motors or inverters) can include components which can generate a voltage level of a capacitor coupled to the bused connection. For example, a motor/inverter complex can be mechanically coupled to one or more wheels, differentials, or axles, such that a rotation of the wheels, differentials, or axles can cause a rotation of the rotor which can generate a back electro-motive force to contribute to the bus voltage, in at least one state. The motor can generate a force in excess of a threshold. For example, a rapid acceleration or deceleration of the electric vehicle can cause the motor/inverter complex to generate a voltage in excess of a target voltage. To avoid, mitigate, or correct such a condition, a controller can engage a plurality of switches to form connections between various portions (e.g., coils) of the electric motor. The connections can discharge the back electro-motive force by causing a current flow between the windings, and thereby dissipating the energy (e.g., as heat in the windings), in at least one state.

A controller can receive a call to reduce a voltage of the capacitor, responsive to a state of the vehicle. Sensors can detect the state of the vehicle, such as by the detection of a condition, or detecting a receipt of a call to reduce the voltage (e.g., to discharge the capacitor). For example, the call can be responsive to an interface (e.g., a mechanical or electrical human machine interface) or a detected condition (e.g., an accelerometer exceeding an acceleration value or a roll angle). The controller can receive the call from a component of the electric vehicle (e.g., an airbag subsystem). Responsive to the call to reduce the voltage of the capacitor, the controller can determine a voltage of the capacitor, and determine if the plurality of switches have been engaged (e.g., by the controller). If the controller determines that the plurality of switches are engaged, the controller can maintain the state of the plurality of switches (e.g., to further discharge the capacitor). If the controller determines that the plurality of switches are not engaged, the controller can initiate an action to discharge the bus. For example, the controller can engage the plurality of switches to cause a short circuit (e.g., enter a DC bus isolation state) or inject current into one or more motors of the electric vehicle to generate thermal energy without generating motive force therefrom (e.g., perform an active discharge within a voltage limit ellipse).

FIG. 1 depicts a system 100 of an electric vehicle, in accordance with some aspects. The system 100 can include at least one electric motor 102. The system 100 can include at least one non-propulsion electrical high voltage (HV) component 104. The system 100 can include at least one sensor 106. The system 100 can include at least one controller 108, such as a motor controller 108. The system 100 can include at least one energy storage device 110. The system 100 can include at least one battery contactor 112. The system 100 can include at least one switching component 114. The system 100 can include at least one capacitor 116. The system can include at least one inverter 118. The system 100 can include at least one data repository (not depicted) such as a data repository accessible to the controller 108.

The electric motor 102, non-propulsion HV component 104, sensor 106, controller 108, energy storage device 110, battery contactor 112, switching component 114, capacitor 116, or inverter 118 can each include at least one processing unit or other logic device such as a programmable logic array engine, or a module configured to communicate with the data repository or database. The electric motor 102, non-propulsion HV component 104, sensor 106, controller 108, energy storage device 110, battery contactor 112, switching component 114, capacitor 116, or inverter 118 can include hardware elements, such as one or more processors, logic devices, or circuits. For example, the system 100 can include one or more components or structures of functionality of the computing device depicted in FIG. 8.

The data repository can include one or more local or distributed databases, and can include a database management system. The data repository can include computer data storage or memory and can store one or more vehicle parameters, connection states, or motive effort/DQ data. The vehicle parameters can include vehicle information, such as information sensed or received by the vehicle. For example, a position, vehicle speed, wheel speed, motor speed, or maintenance setting can be sensed, communicated, or otherwise received by the system 100. The connection state can include the connection state of an energy storage device 110, or other components of the electric vehicle. For example, connection between a bus (e.g., a DC link 120), inverters, motors, or phases thereof can be received by the data repository. The motive effort/DQ data can include a characteristic of one or more motors, or a current or previous operating state thereof.

Still referring to FIG. 1, the system 100 can include at least one propulsion electrical component designed, constructed or operational to convert between electrical and mechanical energy in at least some states. For example, the propulsion electrical components can be or include an electric motor 102 or inverter 118. The electric motor 102 can be connected to the inverter 118 or a DC to DC converter. For example, the electric motor 102 can be electrically coupled to the inverter 118 such that power can be delivered from a bused connection to the inverter 118. The DC link 120 can deliver a DC signal to an input port of the inverter 118. A DC electric motor 102 can be connected to the DC link, such as directly, or through a DC to DC converter or filtering circuit. The DC electric motor 102 can be a propulsion DC electric motor 102 (e.g., to propel the electric vehicle) or non-propulsion DC electric motor (e.g., to circulate coolant). Various devices can be connected along the DC link 120. For example, the various system devices can exchange energy over the DC link 120 (e.g., as a source or a sink). The voltage of the DC link 120 can rise or fall incident to exchanges of energy (such as responsive to an imbalance between the source and sink power).

An electric vehicle can include more than one electric motor 102. For example, a vehicle can include one motor on an axle or one motor per wheel. Electric motors 102 can couple to a plurality of wheels or axles through a differential. Each electric motor 102 can be coupled to a DC link 120 via an inverter 118 (e.g., each electric motor can be coupled to a separate inverter). The propulsion electrical components can deliver power to the drive components of the electric vehicle, (e.g., a battery can provide power for the electric motors 102 to generate tractive effort) or the drive components of the electric vehicle can deliver power to the DC link 120 (e.g., to power other devices, or recharge the battery). For example, the electric motor 102 can operate as a generator under braking to generate electrical power from the mechanical power applied thereto. An electric motor 102 can be associated with a maximum generation power capacity or rate of change. The power generation capacity or rate of change can be based on an attribute of the electric motor 102, or can be based on another component of the electric vehicle (e.g., a battery or an inverter 118).

An inverter 118 can interface with the electric motor 102 through an output port, such as via a switching component 114 of the inverter 118. The inverter 118 can invert the DC link 120 signal to an AC signal having any number of phases. For example, an inverter 118 can contain one or three phases for a one or three phase AC motor 102. The respective phases can have a relationship therebetween (e.g., each phase in a three-phase AC motor 102 can offset by 120°). The inverter 118 can be coupled to a capacitor 116, such as via one or more bused connections (e.g., a DC link 120). For example, a bus bar or other conductive element can join a plurality of components such as a battery or other energy storage device 110, and the non-propulsion high voltage electrical components 104.

The inverter 118 can interface with the electric motor 102 connecting to the DC link 120. For example, the inverter 118 can control the motor speed based on the current passed to the electric motor 102. The DC link voltage level can affect a motor performance based on a voltage thereof. For example, a lower DC link 120 voltage can result in lower motor power (e.g., based on a fixed current of the inverter 118 or electric motor 102). Various devices connected to the DC link 120 can result in transient signals. A DC link capacitor 116 can reduce the transients of the DC link 120. For example, the DC link 120 can include a bus bar, or other conductive element to convey energy between any devices connected thereto. The capacitor 116 can include any number of constituent capacitors 116. One or more of the DC link capacitors 116 can be integral to another component connected to the DC link, such as an inverter 118. For example, an inverter 118 can include an input or output stage having a capacitor across the DC link (e.g., to mitigate transients, such as RF emissions).

A propulsion electrical component, such as the inverter 118 or a device communicatively coupled thereto, can detect a status of the device or an event. For example, an inverter 118 status indicator (e.g., a bit, flag, or latched state) can indicate a condition of the inverter. The status indicator can be checked periodically, or responsive to an event. For example, the condition of the inverter can include a detection of a voltage exceeding a target voltage. The inverter can receive an indication (e.g., from the controller 108) to induce a DC bus isolation state (e.g., a short circuit between windings), responsive to a condition or event. The event can be or include the rise of the voltage of the DC link 120 or an current or rate of change of a current supplied to or from the inverter 118 (e.g., from the electric motor 102). For example, a sudden acceleration, deceleration, or other change in torque can induce a back electro-motive force which the controller 108 can detect.

A switching component 114, such as a series of contactors can be intermediary to the electric motor 102 or other devices of the electric vehicle such as the DC link 120 or capacitor 116 thereof, the battery or other energy storage device 110, or the inverter 118. The switching component 114 can be integral to a device of the electric vehicle such as the inverter 118. References to a connection between an electric motor 102 and the inverter 118 can refer to a connection between the electric motor 102 and one or more circuits of the inverter 118, such as a rectification or inversion circuit including the switching components 114. The switching component 114 can include switches which connect between phases of an electric motor 102. The selective opening and closing of the switches can connect the phases of the electric motor 102 to an inverter 118 or a portion thereof (such as to source or sink energy therefrom), or to cause current circulation within the motor (e.g., between the windings of each phase). For example, the switching component 114 can cause electric motor current to dissipate in the windings, as heat, rather than generating mechanical or electrical power by inducing a short circuit (e.g., the bus isolation state). The switching component 114 or constituent portions thereof can be engaged or disengaged responsive to a detection of an inverter event. For example, the controller 108 can engage the switching component 114 responsive to a detection of a condition or event (e.g., the rise in voltage of the DC link 120 or a current of the inverter 118 or electric motor 102). The switching components 114 can include various solid-state (e.g., semiconductor) devices such as relay switches to selectively pass current between a DC link and an AC motor 102. The controller 108 can transition the switching components between states or modes. In an inversion or rectification mode, switching components 114 can switch at a speed or duty cycle to control an output thereof. The controller can latch the switching components into a static state according to a mode or state of operation.

The system 100 can include or interface with at least one non-propulsion high voltage electrical component 104 designed, constructed or operational to source or sink energy to or from a same electrical connection as the propulsion electrical components. For example, the propulsion electrical components, such as the electric motor 102 and inverter 118 and non-propulsion high voltage electrical component 104 can be in electrical contact with a same capacitor 116. Non-propulsion high voltage electrical components 104 can include an on board charger or DC to DC converter thereof, an A/C compressor, or a heat pump. The non-propulsion high voltage electrical components 104 can source or sink power from the DC link 120. For example, the non-propulsion high voltage electrical components 104 can source power from the DC link 120 during at least some steady-state operations, and comprise capacitors 116 that can provide energy to the DC link 120, such as upon a reduction of the DC link 120 voltage. The non-propulsion high voltage electrical components 104 can have an operating voltage equal to the voltage of the DC link 120 (e.g., may include various converters, filters, or other elements to exchange power therewith), such as a voltage in excess of 60 volts DC (e.g., 400 volts or 800 volts).

The system 100 can include or interface with at least one sensor 106 designed, constructed or operational to sense a state of an electric vehicle. For example, the sensors 106 can include a speed sensor 106. A ground speed sensor 106 such as a GPS sensor 106, a radar sensor 106, or a LiDAR sensor 106 can determine a vehicle speed with respect to a reference. A motor, wheel, or differential sensor 106 can determine a rotational speed of a component of the electric vehicle. An accelerometer sensor 106 can detect a position of the electric vehicle. The sensor 106 can include one or more voltage sensors 106 or current sensors 106 for any of the electric vehicle components described herein. The sensors 106 can include sensors 106 for the detection of a position of various switches or contactors of the electric vehicle. The sensors 106 can include sensors for thermal or other properties of components of the electric vehicle, and a status of an interface, such as any selections or stored entries thereof (e.g., user entered commands, mechanical switch, or button positions). The one or more sensors 106 can convey information to the one or more controllers 108. The information can be conveyed responsive to a request (e.g., polled), periodically, or based on a predefined threshold of the sensor 106.

The system 100 can include at least one controller 108 designed, constructed or operational to exert control signals to one or more components of an electric vehicle. For example, the controller 108 can be or include a motor controller 108, a switching component controller 108, or a communicative connection with an interface. The controller 108 can control the speed or direction of a motor, such as by adjusting a current limit of one or more inverters 118 associated with (e.g., supplying power to) the electric motors 102.

The controller 108 can cause the electric motor 102 to enter various states or modes, such as by an interface with the electric motor 102, inverter 118, or a switching component 114 disposed therebetween. For example, the controller 108 can introduce current to an electric motor 102 in a thermal operation envelope, wherein the current of the electric motor 102 generates thermal energy with no motive effort, or insubstantial motive effort (e.g., motive effort which is inadequate to propel the electric vehicle). The thermal operation envelope, can be defined by a phase of an input current. For example, the input current can be defined with reference to a direct axis (e.g., aligned with a rotor magnetic field), and quadrature axis aligned orthogonally thereto. The input signal can be an AC phased signal, or a DC signal (e.g., the thermal operation envelope can include DC injection braking for performing an active discharge). Operation of one or more electric motors 102 in the thermal operation envelope can be referred to as a current injection state or mode, or as an active discharge. A portion of the states or modes of the electric vehicle are not exclusionary. For example, some states can be simultaneously active between or within an inverter 118 or electric motor 102. For example, an inverter 118 can perform an active discharge simultaneously with another inverter 118 operating in a short circuit state such as a DC bus isolation state.

The controller 108 can actuate various switches to dissipate energy as thermal energy. The example, the controller 108 can actuate the switching component 114 between various windings of the electric motor 102 to cause a current to pass through windings of a plurality of phases of the electric motor 102 (e.g., to engage a DC bus isolation state). The switches of the switching component 114 can in included in an inverter 118, in an electric motor 102, or a separate component disposed therebetween, any of which may be referred to as intermediary to the electric motor 102 or the inverter 118. The controller 108 can open one or more switches to segregate the electric motor 102 from a DC link 120 or a capacitor 116 thereof. The controller 108 can actuate (e.g., open or close) one or more switches to allow the motor to convert between mechanical energy of the drive system mechanical components and electrical energy of the DC link 120, or a capacitor 116 thereof. For example, the DC link 120 can power the propulsion of the electric vehicle through gears, differentials, or wheels. The controller 108 can actuate (e.g., open or close) one or more switches to short circuit the DC link or a capacitor thereof. The controller 108 can actuate (e.g., open or close) one or more switches to cause the motor to dissipate mechanical or electrical energy as thermal energy (e.g., in an active discharge state operating within the voltage limit ellipse).

The controller 108 can take various actions responsive to information received from a sensor 106 or interface. For example, the controller 108 can determine that a DC link 120 should be de-energized responsive to a user input received from the interface, such as for a maintenance procedure. The controller 108 can determine that the DC link 120 should be reenergized according to an operating parameter of the electric vehicle, such as a value or change in value of an accelerometer (e.g., indicating a change in speed in excess of a threshold, or an orientation of the vehicle, such as a non-upright orientation of the vehicle, wherein DC link 120 power may not be employed). The controller 108 can detect various states, conditions, events, or other information associated with the electric vehicle including those disclosed herein. For example, the controller 108 can receive information indicative of a call to discharge the DC link 120 (e.g., a capacitor 116 thereof) from a vehicle restraint system. The call to discharge the DC link 120 can be directed to discharging the DC link 120, or can be another signal (e.g., to engage an active restraint system) which can be indicative of a call to discharge the DC link 120.

The system 100 can include or interface with at least one energy storage device 110 designed, constructed, or operational to store energy, such an energy storage device 110 to store energy as chemical energy (e.g., comprising a battery, battery pack, or battery module). The energy storage device 110 can be connected to the DC link 120 by a contactor (e.g., relays, switches, or other selectably engaged connections). The contactor (such as a battery contactor 112) can be communicatively coupled to the controller 108, such that the controller 108 can actuate the battery contactor 112 by connection to one or more poles of the battery contactor. The contactor can be a two-pole or multi-pole contactor. For example, the controller 108 can open the battery contactor 112, responsive to a condition indicative of a call to isolate one or more components connected to the DC link 120 (e.g., during operation or maintenance of the electric vehicle).

The battery pack can include a plurality of cells, cell balancing hardware, or a sensor suite to report the status of the battery pack and associated components. The battery pack can store energy, and the operations of the battery pack can be configured (e.g., in response to a user preference or another communication). For example, a maximum and minimum charge state can be established which can be relevant to the wear of the cells of the battery or of other components. The battery pack cells can include a thermal management system including a thermal management device. The battery pack can be, include, or be subdivided into modules or submodules which can include or be associated with battery cells and thermal management systems. Each battery pack, module, or submodule can include a plurality of cells such as prismatic, cylindrical, rectangular, square, cubic, flat, or pouch form factor cells.

The system 100 can include or interface with at least one drive system designed, constructed or operational to transfer mechanical energy from the electric motor 102 to tractive effort of the electric vehicle, or to transfer mechanical energy to the electric motor 102. The drive system can include drive shafts, wheels, tires, treads, differentials, bearings, axles, or other components to generate or convey energy between the electric motor 102 and a tractive effort of the electric vehicle. The drive system components can generate or maintain power based on inertial movement, or an interface with a terrain surface (e.g., rolling down a hill). The drive system components can deliver energy to the electric motor 102 when the electric motor 102, DC link 120, energy storage device 110, or other components are energized or de-energized. For example, a DC link 120 which is de-energized can become re-energized by energy delivered, via the electric motor 102 or inverter 118, from the drive system. In some modes or states, such as a short circuit state or an active discharge, the energy from the drive system can be dissipated in the electric motor 102 which may arrest or reduce a movement of the electric vehicle or a (re)charging of the DC link 120.

The system 100 can include or interface with at least one reintegration component designed, constructed or operational to restore the DC link 120 or a capacitor 116 thereof to a charged state. For example, the reintegration component can include a timer (e.g., a timer of the controller 108), and one or more sensors 106 (e.g., temperature sensors 106, such as motor thermistors, motion sensors 106 such as accelerometers or wheel speed sensors 106, or vehicle occupancy sensors 106). The reintegration component can restore the DC link 120 automatically (e.g., without user intervention) such as following a pre-defined time for which the vehicle has not undergone movement or fulfilled criteria measured by additional sensors 106. The reintegration component can restore the DC link 120 responsive to a command received by the vehicle interface. The reintegration component can be separate from or (as depicted) integral to the controller 108.

The system 100 can include or utilize at least one interface designed, constructed or operational to provide an indication of a state of a vehicle or vehicle parameters, or to receive a communication, such as from a user. For example, the interface can include a graphical user interface (GUI) or a mechanical switch. For example, the battery contactor can include a user-operable switch to disconnect an energy storage device 110 from the DC link. The battery contactor can sever a connection providing power from at least a portion of the interface (e.g., the GUI). Various portions of the interface can include or be configured to interface with an auxiliary power source, such as power source which is less than 60 volts (e.g., 12 volts, 24 volts, or 48 volts). The interface can interface with sensors 106 to provide a status of one or more sensors 106, or can include or be communicatively coupled to the data repository to access vehicle parameters including historical vehicle parameters, which can be stored in a non-volatile memory. The interface can be separate from or (as depicted) integral to the controller 108.

Figure 2:
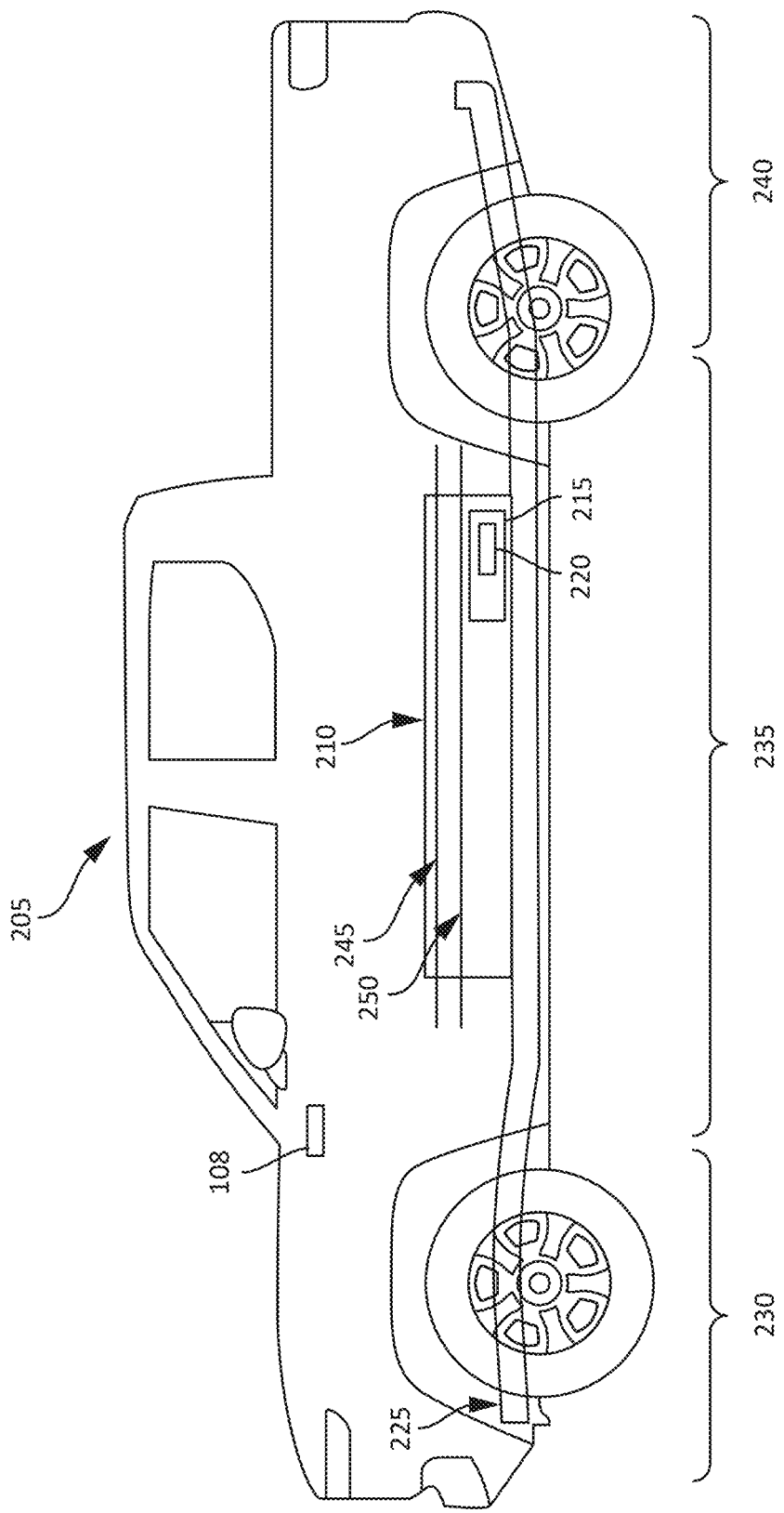
FIG. 2 depicts an electric vehicle, in accordance with some aspects.

FIG. 2 depicts a cross sectional view of an electric vehicle 205 installed with at least one battery pack 210. Electric vehicles 205 can include electric trucks, electric sport utility vehicles (SUVs), electric delivery vans, electric automobiles, electric cars, electric motorcycles, electric scooters, electric passenger vehicles, electric passenger or commercial trucks, hybrid vehicles, or other vehicles such as sea or air transport vehicles, planes, helicopters, submarines, boats, or drones, among other possibilities. The battery pack 210 can also be used as an energy storage device to power a building, such as a residential home or commercial building. Electric vehicles 205 can be fully electric or partially electric (e.g., plug-in hybrid) and further, electric vehicles 205 can be fully autonomous, partially autonomous, or unmanned. Electric vehicles 205 can be human operated or non-autonomous. Electric vehicles 205 such as electric trucks or automobiles can include on-board battery packs 210, battery modules 215, or battery cells 220 to power the electric vehicles 205. The electric vehicle 205 can include a chassis 225 (e.g., a frame, internal frame, or support structure). The chassis 225 can support various components of the electric vehicle 205. For example, the chassis can support an electric motor 102 or an inverter 118. The chassis 225 can span a front portion 230 (e.g., a hood or bonnet portion), a body portion 235, and a rear portion 240 (e.g., a trunk, payload, or boot portion) of the electric vehicle 205.

The battery pack 210 can be installed or placed within the electric vehicle 205. For example, the battery pack 210 can be installed on the chassis 225 of the electric vehicle 205 within one or more of the front portion 230, the body portion 235, or the rear portion 240. The battery pack 210 can include or connect with at least one bus bar, e.g., a current collector element. For example, the first bus bar 245 and the second bus bar 250 can include electrically conductive material to connect or otherwise electrically couple the battery modules 215 or the battery cells 220 with other electrical components of the electric vehicle 205 to provide electrical power toor from various systems or components of the electric vehicle 205. The first bus bar 245 or the second bus bar 250 can be a conductor for the DC link 120 (e.g., a ground or supply portion thereof). For example, the first bus bar 245 or the second bus bar 250 can connect to a capacitor 116 of the DC link 120, or to other devices described herein such as propulsion electrical components and non-propulsion high voltage electrical components 104.

The controller 108 can be communicatively or electrically connected to various elements of the electric vehicle 205. For example, the electric vehicle can include at least the elements of FIG. 1, and the controller can communicate between the components to perform the methods disclosed herein. For example, the controller 108 can engage a battery contactor 112 to remove an energy storage device 110 from the DC link 120 and discharge the DC link 120 of the electric vehicle 205 within a predefined time such as 2 seconds, 1 second, or 500 milliseconds.

Figure 3:
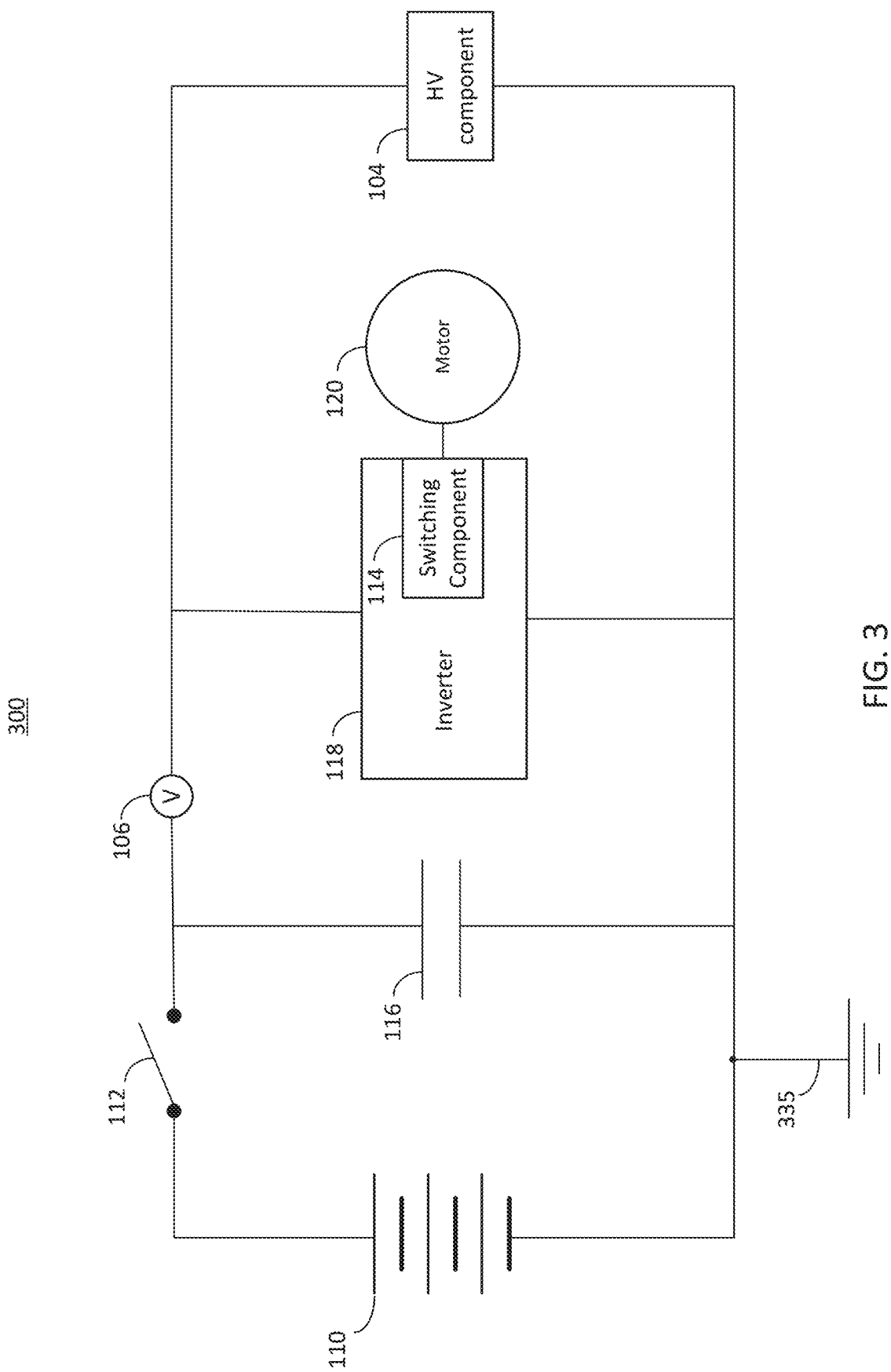
FIG. 3 depicts a circuit for a DC bus of an electric vehicle, in accordance with some aspects.

FIG. 3 depicts a circuit 300 for a DC bus (e.g., DC link 120) of an electric vehicle 205, such as the electric vehicle 205 of FIG. 2, in accordance with some aspects. The circuit 300 can include one or more components or functionality depicted in FIG. 1. The energy storage device 110 can connect to a supply output or a ground output 335 via a battery contactor 112. The battery contactor 112 can be communicatively coupled to the controller 108 such that the controller 108 can actuate the battery contactor 112 to remove or restore the energy storage device 110 to the DC link 120. The battery contactor 112 can include a switch, interface, or sub-circuit for a user to engage or disengage the contactor, such as in conjunction with or independent of the interface (e.g., a mechanical or electric selection). A voltage sensor 106 can determine a voltage of the DC link. For example, the voltage of the DC link can be about 400 volts or about 800 volts when the battery is connected thereto (e.g., when the battery contactor 112 is closed).

At least one DC link capacitor 116 can smooth (e.g., reduce fluctuations due to noise or other artifacts) the voltage of the DC link 120, provide transient protection, reduce ripple, or otherwise condition the DC link 120. The capacitor 116 can be permanently connected to the DC link 120 (e.g., welded, bolted, or integral to the DC link 120). For example, the capacitor 116 can be connected to the DC link 120 by a connector which is not controllable by the controller 108. Additional filtering devices can condition the DC link 120. For example, the inverter 118 can source or sink current which exceeds a sourcing or sinking current of the battery (e.g., a permitted or desired rate). An electric motor 102 can be connected to the DC link, and thus to additional components thereof, such as the capacitor 116. For example, the electric motor 102 can be connected to the DC link 120 via the inverter 118 or the switching components 114. The inverter 118 can provide an AC signal to the motor, such as one or more (e.g., three) phases. Some electric motors 102 (e.g., DC electric motors 102) can connect directly to the DC link 120, or can connect to the DC link 120 via a DC to DC converter. The electric motor 102 can provide electric power to the DC link 120, which can cause the voltage level of the DC link 120 to rise. For example, the voltage can rise to charge the energy storage device 110, or the capacitor 116 (e.g., when the battery contactor 112 is open). For example, the electric motor 102 can charge the DC link 120 to a value in excess of 60 volts DC, 400 volts DC, or 800 volts DC. One or more non-propulsion high voltage electrical components 104 can be connected to the DC link 120. The non-propulsion high voltage electrical components 104 can provide power to the DC link 120, which can raise the voltage of the energy storage device 110, the DC link 120, or the capacitor 116 (e.g., when the battery contactor 112 is open or closed) to a voltage in excess of 60 volts DC, 400 volts DC, or 800 volts DC. The electric motor 102 can dissipate mechanical energy or electrical energy as thermal energy, such as when operating in a short circuit state, or a current injection state. The electric motor 102 can discharge the energy or of the DC link 120. For example, the electric motor 102 can discharge the DC link 120 from a value in excess of 60 volts (e.g., about 400 volts or about 800 volts) to a value less than 60 volts (e.g., about 0 volts).

Figure 4:
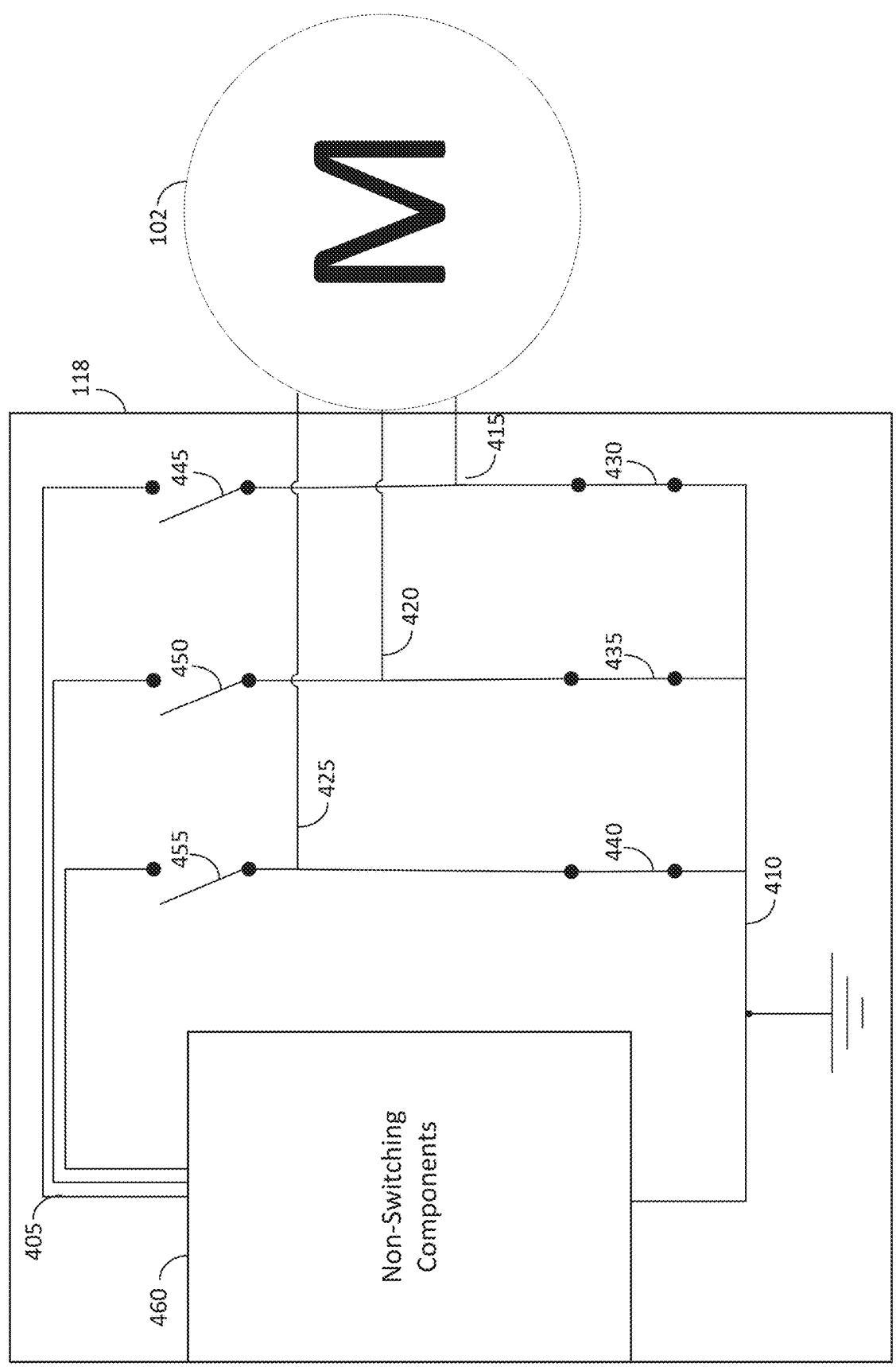
FIG. 4 depicts switching contacts for a three-phase AC electric motor, in accordance with some aspects.

FIG. 4 depicts switching contacts for a three-phase AC electric motor 102, in accordance with some aspects. The non-switching components 460 can include oscillators, bulk capacitance, transformers, or interface terminals. The non-switching components 460 can be disposed intermediate to the switching components 114 of the inverter 118 and the electric motor 102, or the capacitor 116. For example, the non-switching components 460 can be distributed throughout the inverter. For example, the non-switching components 460 or the switches can include an interface to the controller 108 to receive instructions therefrom. The switches, as depicted, interconnect the phases of the motor, such that the phases are connected to each other (e.g., enters a short circuit state). For example, the first lower contact 430, second lower contact 435, and third lower contact 440 connect to a first phase 415, second phase 420, and third phase 425 of the electric motor 102, respectively. Connecting the plurality of phases of the electric motor 102 can cause any current generated in the electric motor 102 to dissipate as thermal energy from the current flowing through the windings. For example, the electric motor 102 can receive mechanical (e.g., kinetic) energy from one or more drive system components coupled thereto, to convert the mechanical energy to thermal energy of the windings of the electric motor 102.

The electric motor 102 can be segregated from the inverter 118 by opening all switches. The electric motor 102 can be connected to the inverter 118 such as by closing the first upper contact 445, the second upper contact 450, and the third upper contact 455, while opening the first lower contact 430, the second lower contact 435, and the third lower contact 440. The electric motor 102 can enter various states connected to the inverter 118. For example, the controller 108 can cause current to be injected into the motor to dissipate energy as heat (e.g., can perform an active discharge). The controller 108 can cause the electric motor 102 to operate within a thermal operation envelope (e.g., by communication with the inverter 118). The electric motor 102 can operate in a propulsion mode, such as by supplying power at another operating point to develop tractive effort or to generate electrical power from the mechanical energy imparted to the electric motor 102 from drive system components.

The switches can be open in a default state, or closed in a default state. The opening or closing of switches can be performed by an act of the controller 108 or by an inaction. For example, the controller 108 can deliver a message or signal (e.g., a digital output or analog output) to open or close one or more switches. The indication to open or close the switch can be based on a heartbeat message provided by the controller 108 or an absence of a heartbeat message provided by the controller 108, or provide another indication to open or close the switches. A motor ground or neutral line 410 can be shared with a ground output 335 of the energy storage device 110, or can be separate (e.g., isolated therefrom). One or more inverter outputs 405 can provide power to the electric motor 102, such as a current or voltage limited power, based on a limit imposed (e.g., communicated) by the controller 108.

Figure 5:
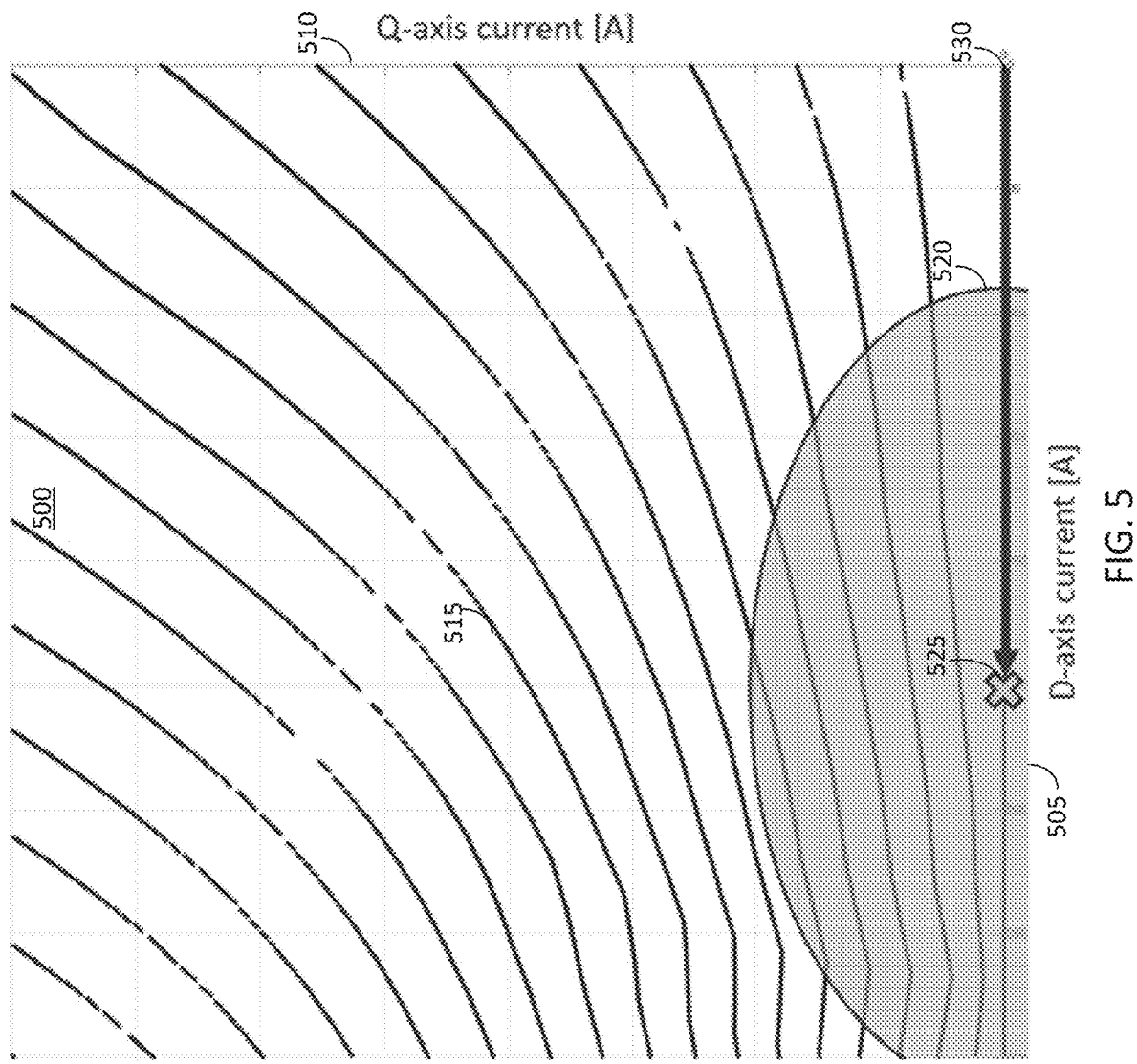
FIG. 5 depicts a Q-D axis having a voltage limit ellipse, in accordance with some aspects.

FIG. 5 depicts a chart 500 including a voltage-limit ellipse 520 disposed over Q-D axes 505, 510 of an electric motor 102, in accordance with some aspects. For example, the direct (D) axis 505 can refer to an axis aligned to a magnetic field of a rotor of the electric motor 102 and the quadrature (Q) axis 510 can refer to a perpendicular axis. Torque can be generated by applying various combinations of current with respect to the D axis 505 and Q axis 510. For example, a first torque value 515 can provide a motive effort for a plurality of currents and voltages defined by the line of the first torque value 515. A voltage-limit ellipse 520 can refer to a region of operation in which motive effort may not be generated (e.g., may become voltage limited). Thus, an operating point 525 selected in the voltage-limit ellipse 520 can cause the motor to operate in a thermal operation envelope, causing the electric vehicle to enter a current injection state. For example, the operating point can be aligned with the D axis 505, having a Q axis 510 component of zero, as depicted, having a current defined by a vector 530 disposed along the D axis 505.

The controller 108 can communicate with the inverter 118 or the electric motor 102 to receive motor phase information (e.g., from a speed or angular sensor 106) the controller 108 can determine a current magnitude and phase to supply the electric motor 102 and supply the current magnitude and phase information to the inverter 118 or the electric motor 102 to control a current applied to the motor windings. For example, the controller 108 can provide an operating mode for the motor to provide tractive effort (to propel the vehicle) or to operate in a thermal operation envelope.

Figure 6:
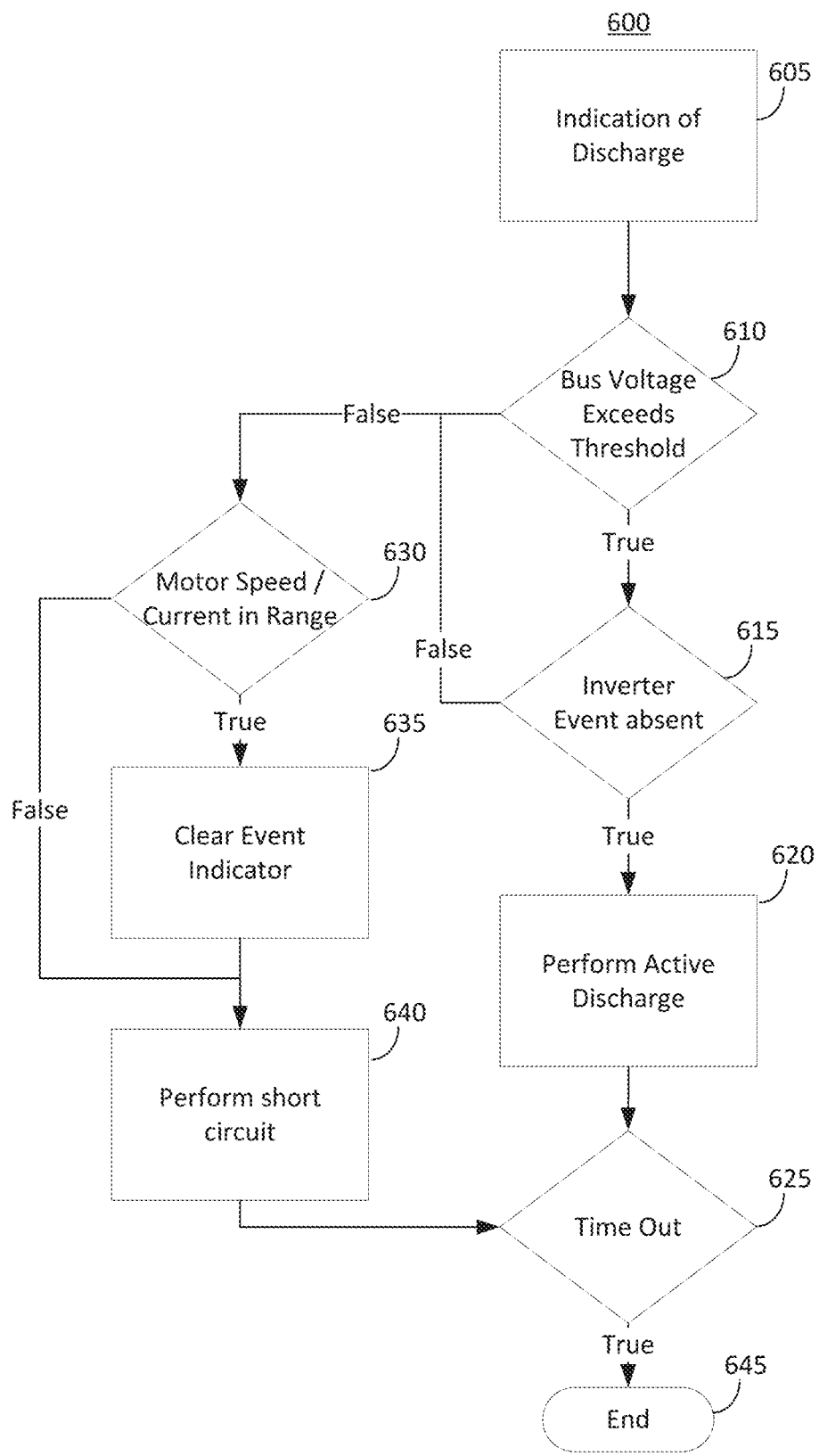
FIG. 6 depicts a flow diagram for a method according to the present disclosure, in accordance with some aspects.

FIG. 6 depicts a flow diagram for a method 600 to discharge a component, in accordance with some aspects. The method 600 can be performed by one or more components or systems 100 depicted in FIG. 1-4 or 8. At ACT 605, an indication to discharge a voltage is received. At ACT 610, a bus voltage is compared to a threshold. At ACT 615, an inverter event status is detected. At ACT 620, the system performs active discharge. At ACT 625, an elapsed time is compared to a pre-defined time. At ACT 630, a motor speed or current is compared to a range. At ACT 635, an event indicator is cleared. At ACT 640, the system performs a three-phase short circuit. At ACT 645, the method terminates.

At ACT 605, an indication of a discharge is received. For example, a sensor 106 can detect a condition indicative of a call to discharge a portion of the electric vehicle 205. The condition can relate to an entry from an interface, a change in acceleration or pressure, a change in a rotational speed, a condition or event detected by a camera system, or a combination of information sensed from a plurality of sensors 106. The controller 108 can detect the indication, such as by processing sensor data (e.g., polled or interrupt based sensor data), or a receipt of a message providing a pre-determined indication to initiate the discharge. The message can be directed to the controller 108 for the purpose of discharging the component, or for another purpose, such as to engage another system, which conveys an indication to discharge the component. Upon receiving an indication to discharge the component, the battery contactor 112 can be opened to remove the energy storage device 110 from the DC link 120; additional components, such as the capacitor 116 can retain energy which can maintain all or a portion of a voltage level of the DC link 120.

At ACT 610, a voltage of a connection such as the DC link 120 is compared to a threshold. The voltage of the connection can be measured directly (e.g., by a voltage sensor 106) which determines a voltage or determines a voltage with regard to a reference signal (e.g., a comparator). The threshold can be any value such as a DC value. For example, the threshold can be 60 volts DC. Responsive to a determination that the voltage exceeds the threshold, the method 600 can proceed to ACT 615. Responsive to a determination that the voltage does not exceed the threshold, the method 600 can proceed to ACT 630.

At ACT 615, an inverter event status can be determined (e.g., polled, referenced, or received). The inverter event status can indicate that the inverter 118 has, responsive to a back EMF or other condition, entered a short circuit state, which can reduce a voltage of a component, such as the capacitor 116. The method 600 can proceed to ACT 630 upon such a determination. The method 600 can proceed to ACT 620, responsive to determining that the inverter event is absent (e.g., that the inverter 118 is not in a DC bus isolation state or another short circuit state). At ACT 620, the system 100 performs active discharge. For example, the system can operate within a voltage-limit ellipse, such as by injecting a current in the quadrature direction (e.g., lacking a D component). A circuit (e.g., the controller 108) can perform active current injection for a predefined time, until reaching a pre-defined voltage, or until heating the electric motor 102 or a component thereof to a pre-defined temperature. Responsive to a completion of the active current injection, the controller can proceed to ACT 625.

At ACT 625, the controller 108 can compare an elapsed time to a pre-defined time. The elapsed time can be based on an indication to discharge the capacitor 116. For example, the elapsed time can be a time elapsed from the detected condition to discharge the capacitor 116, a receipt of the indication to discharge the capacitor 116, a change of state (e.g., a state to discharge the capacitor 116), or a completion of discharging the capacitor 116 (e.g., below the threshold, or to another value, such as zero volts.)

At ACT 630, the controller 108 can compare a motor speed or current to a range. The range can be predefined or can be variable based on one or more vehicle parameters. For example, the range can be a fixed range related to a maximum current, speed, or rate of change. The range can be a same range used to determine if the motor should enter a short circuit state (e.g., a determination which can be made during another operation of the method 600 or prior to commencing the method 600). If the controller determines the motor is in range, the method 600 can proceed to ACT 635, which can change, reset, or de-latch an inverter status indicator, such as an event indicator stored in a memory of or accessible to the controller 108. If the motor is determined to be out of range, then the method can proceed to ACT 640. At ACT 640, a circuit (e.g., the controller 108) can perform an active three-phase short circuit for a predefined time, such as until reaching a pre-defined voltage, or until heating the electric motor 102 or a component thereof to a pre-defined temperature. Responsive to a completion of the short circuit, the controller can proceed to ACT 625.

At ACT 645, the method can terminate, stop, or conclude. For example, the method can latch the DC link 120 or the capacitor 116 in a discharged state, return the DC link 120 or the capacitor 116 to a charged state, or enable a selective engagement of the one or more states of the electric vehicle 205. In some cases, at ACT 645, the method 600 can repeat or lead into another method or process.

The method 600, and other methods disclosed herein can be performed on a per vehicle basis, or a motor/inverter basis. For example, a plurality of inverters can perform the method independently or with one or more cross-dependencies (such as a single state machine defining ACTs for a plurality of inverters or motors). Additional or fewer ACTs can be performed according to the systems and methods disclosed herein. For example, the method 600 can include reintegrating (e.g., recharging) a component such as the DC link 120 or the capacitor 116.

Figure 7:
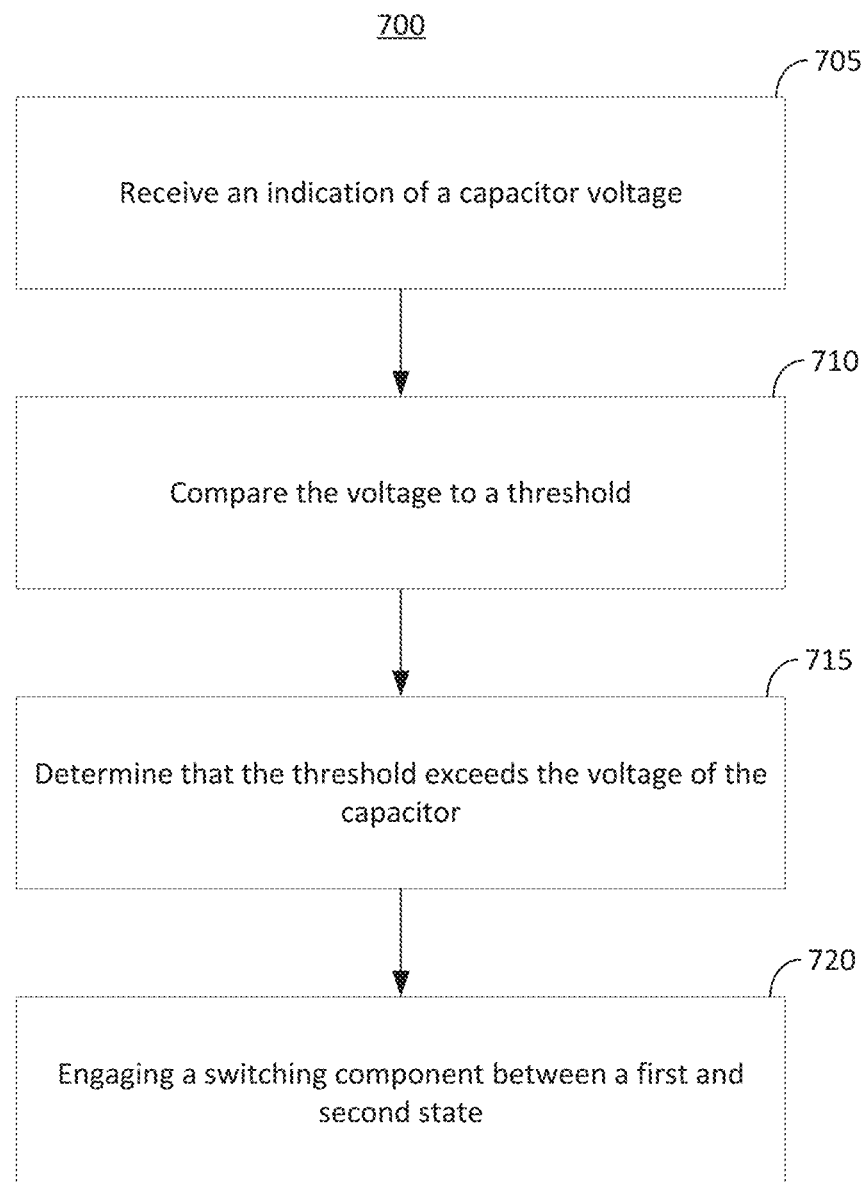
FIG. 7 depicts a flow diagram for a method according to the present disclosure, in accordance with some aspects.

FIG. 7 depicts another flow diagram for a method 700 to discharge a component, in accordance with some aspects. The method 700 can be performed by one or more components or systems depicted in FIG. 1-4 or 8 including, for example, the system 100. At ACT 705, an indication of a capacitor voltage is received. At ACT 710, the voltage is compared to a threshold. At ACT 715, the threshold is determined to exceed the voltage of the capacitor. At ACT 720, a switching component is engaged between a first and second state.

At ACT 705, the controller 108 can receive an indication of a voltage of a capacitor 116. The capacitor 116 can be a capacitor 116 of an electric vehicle. For example, the capacitor 116 can be a bulk capacitor 116 of a DC link 120 of an electric vehicle 205. The capacitor 116 can be independent from (e.g., mechanically separate from) or integral to (e.g., comprised within) other components of the DC link 120. For example, one or more capacitors 116 can be included at a connection of the various devices connected to the DC link 120. The indication of the voltage can be a voltage value, or an indication of a range such as an indication that the voltage exceeds one or more reference values. The capacitor voltage can be detected at or proximal to a capacitor 116, or can be inferred based on another measurement. For example, the capacitor voltage can be determined based on a current of a component connected to the DC link 120, or another bus location. The indication of the voltage can be a maximum momentary voltage (e.g., a combined DC component and AC component such as ripple), a DC voltage (e.g., time average), or an AC voltage.

At ACT 710, the voltage can be compared to a threshold. One or more thresholds can be provided with hysteresis. For example, the value of one or more thresholds can be adjusted based on a previously sensed state. The comparison can be performed by the controller 108, such as responsive to a polled request, based on change of voltage, a periodic signal, or another triggered event (e.g., based on an interrupt or loop). The comparison can be performed by another component of the electric vehicle 205 and provided to the controller 108, such as by an indication addressed to the controller 108 or otherwise accessible thereby.

At ACT 715, the controller can determine the threshold exceeds the voltage of the capacitor 116. For example, the controller 108 can determine that the threshold exceeds the voltage of the capacitor, or an indication addressed to another device and accessible to the controller 108. For example, a threshold can be defined as 55 volts DC, 60 volts, DC, or 65 volts DC. The voltage can be measured as 48 volts DC or 0 volts DC. The controller 108 can store the indication or other messages (e.g., requests, calls, or polls), in a non-volatile memory device of FIG. 8. The stored messages can include a timestamp, a sending or receiving address, or contextual information such as a voltage level, or a state of another vehicle parameter (e.g., of a restraint system).

At ACT 720, the controller 108 can engage a switching component between a first and second state. For example, the first state can be a propulsion state of the vehicle. In the first state, the propulsion electrical component of the electric vehicle 205 can convert between electrical energy and mechanical energy (which can be referred to as kinetic energy). For example, the propulsion electrical components can include at least one inverter 118 electric motor 102 complex, which can receive energy from the DC link 120 (e.g., by an energy storage device 110 connected to the DC link 120). The inverter 118 electric motor 102 complex can provide energy to the drive system components to provide tractive effort for the electric vehicle 205. The propulsion electrical components can provide energy derived from the drive system components to the DC link as electrical energy while in the first state (e.g., to charge the energy storage device 110).

The propulsion electrical component can convert between electrical or mechanical energy and thermal energy in the second state. For example, the propulsion electrical component can include a three-phase electric motor 102, and can dissipate energy stored on the DC link 120 (e.g., in the capacitor 116) or other devices thereupon. The energy storage device 110 can be connected to the DC link 120, or can be disconnected, such as by the actuation of a battery contactor 112 controlled by the controller 108 incident to transitioning between the first and second states. Electrical energy can be dissipated (to thermal energy) by active discharge, or by the dissipation of energy through the motor by actuating a three-phase short of the electric motor 102 windings (e.g., entering a DC bus isolation state), wherein the upper contactors (e.g., of FIG. 4, or variants thereof) are interconnected. The temperature of one or more components of the inverter 118 or electric motor 102 can be detected, or conveyed to the controller 108. Mechanical energy can be dissipated by the electric motor 102. For example, the three-phase short of FIG. 4 can be engaged. The three-phase short of the DC bus isolation state (e.g., short circuit state) can dissipate mechanical energy or increase a resistance to a movement. The DC bus isolation state can arrest or reduce a movement of a device (e.g., a wheel) electro-mechanically coupled to a rotor of the electric motor 102 of the electric vehicle 205, which can prevent a displacement of the electric vehicle 205.

Figure 8:
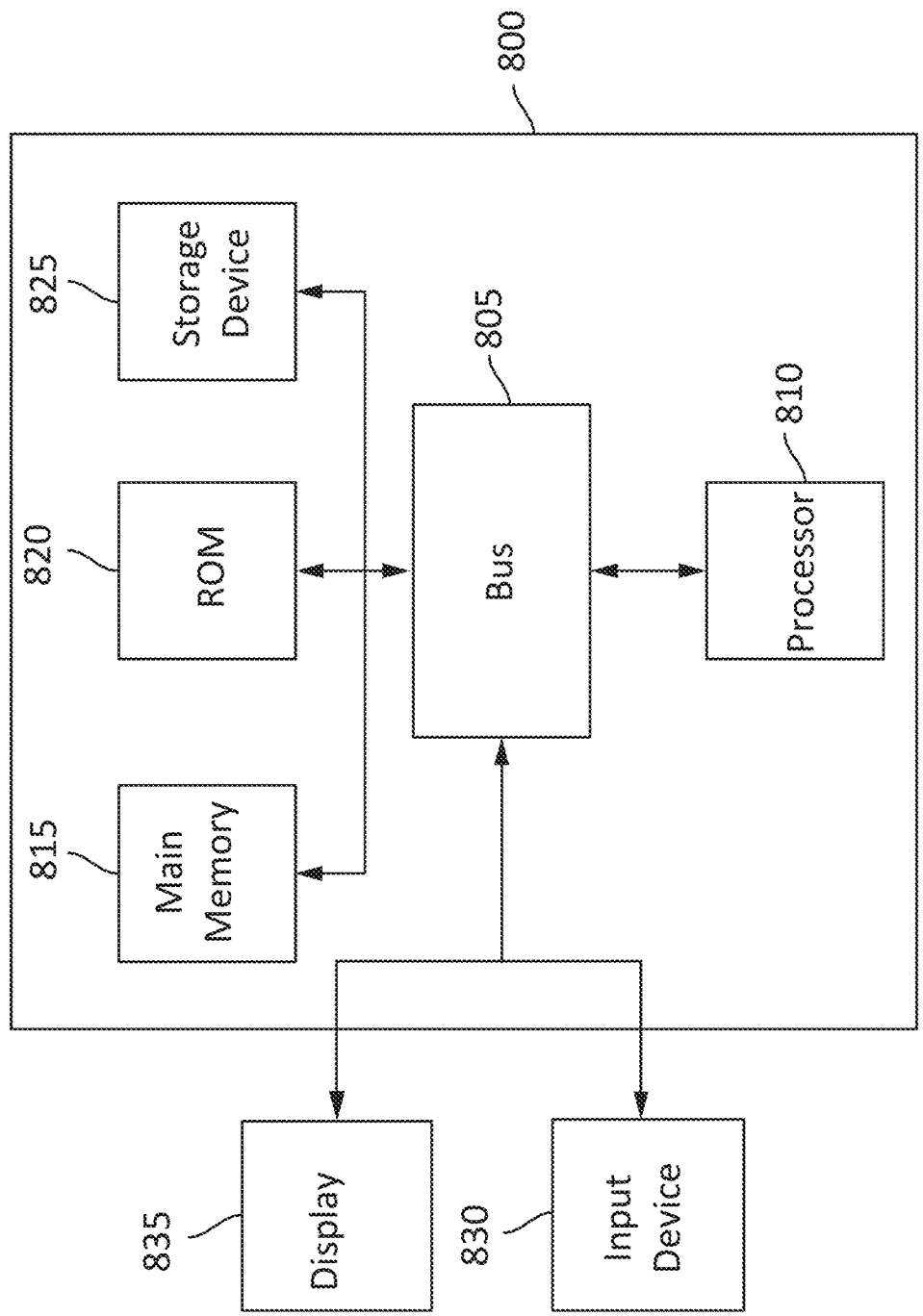
FIG. 8 is a block diagram illustrating an architecture for a computer system that can be employed to implement elements of the systems and methods described and illustrated herein.

FIG. 8 depicts an example block diagram of an example computer system 800. The computer system or computing device 800 can include or be used to implement a system 100 or its components, such as a controller 108, for example. The computing system 800 includes at least one bus 805 or other communication component for communicating information and at least one processor 810 or processing circuit coupled to the bus 805 for processing information. The computing system 800 can also include one or more processors 810 or processing circuits coupled to the bus for processing information. The computing system 800 also includes at least one main memory 815, such as a random access memory (RAM) or other dynamic storage device, coupled to the bus 805 for storing information, and instructions to be executed by the processor 810. The main memory 815 can be used for storing information during execution of instructions by the processor 810. The computing system 800 may further include at least one read only memory (ROM) 820 or other static storage device coupled to the bus 805 for storing static information and instructions for the processor 810. A storage device 825, such as a solid state device, magnetic disk or optical disk, can be coupled to the bus 805 to persistently store information and instructions.

The computing system 800 may be coupled via the bus 805 to a display 835, such as a liquid crystal display, or active matrix display, for displaying information to a user such as a driver of the electric vehicle 205 or other end user. An input device 830, such as a touchscreen, voice control, or other element of the interface may be coupled to the bus 805 for communicating information and commands to the processor 810. The input device 830 can include a touch screen display 835. The input device 830 can also include a cursor control, such as a mouse, a trackball, or cursor direction keys, for communicating direction information and command selections to the processor 810 and for controlling cursor movement on the display 835.

The processes, systems and methods described herein can be implemented by the computing system 800 in response to the processor 810 executing an arrangement of instructions contained in main memory 815. Such instructions can be read into main memory 815 from another computer-readable medium, such as the storage device 825. Execution of the arrangement of instructions contained in main memory 815 causes the computing system 800 to perform the illustrative processes described herein. One or more processors in a multi-processing arrangement may also be employed to execute the instructions contained in main memory 815. Hard-wired circuitry can be used in place of or in combination with software instructions together with the systems and methods described herein. Systems and methods described herein are not limited to any specific combination of hardware circuitry and software.

Although an example computing system has been described in FIG. 8, the subject matter including the operations described in this specification can be implemented in other types of digital electronic circuitry, or in computer software, firmware, or hardware, including the structures disclosed in this specification and their structural equivalents, or in combinations of one or more of them.

Some of the description herein emphasizes the structural independence of the aspects of the system components or groupings of operations and responsibilities of these system components. Other groupings that execute similar overall operations are within the scope of the present application. Modules can be implemented in hardware or as computer instructions on a non-transient computer readable storage medium, and modules can be distributed across various hardware or computer based components.

The systems described above can provide multiple ones of any or each of those components and these components can be provided on either a standalone system or on multiple instantiation in a distributed system. In addition, the systems and methods described above can be provided as one or more computer-readable programs or executable instructions embodied on or in one or more articles of manufacture. The article of manufacture can be cloud storage, a hard disk, a CD-ROM, a flash memory card, a PROM, a RAM, a ROM, or a magnetic tape. In general, the computer-readable programs can be implemented in any programming language, such as LISP, PERL, C, C++, C#, PROLOG, or in any byte code language such as JAVA. The software programs or executable instructions can be stored on or in one or more articles of manufacture as object code.

Example and non-limiting module implementation elements include sensors providing any value determined herein, sensors providing any value that is a precursor to a value determined herein, datalink or network hardware including communication chips, oscillating crystals, communication links, cables, twisted pair wiring, coaxial wiring, shielded wiring, transmitters, receivers, or transceivers, logic circuits, hard-wired logic circuits, reconfigurable logic circuits in a particular non-transient state configured according to the module specification, any actuator including at least an electrical, hydraulic, or pneumatic actuator, a solenoid, an op-amp, analog control elements (springs, filters, integrators, adders, dividers, gain elements), or digital control elements.

The subject matter and the operations described in this specification can be implemented in digital electronic circuitry, or in computer software, firmware, or hardware, including the structures disclosed in this specification and their structural equivalents, or in combinations of one or more of them. The subject matter described in this specification can be implemented as one or more computer programs, e.g., one or more circuits of computer program instructions, encoded on one or more computer storage media for execution by, or to control the operation of, data processing apparatuses. Alternatively or in addition, the program instructions can be encoded on an artificially generated propagated signal, e.g., a machine-generated electrical, optical, or electromagnetic signal that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. While a computer storage medium is not a propagated signal, a computer storage medium can be a source or destination of computer program instructions encoded in an artificially generated propagated signal. The computer storage medium can also be, or be included in, one or more separate components or media (e.g., multiple CDs, disks, or other storage devices include cloud storage). The operations described in this specification can be implemented as operations performed by a data processing apparatus on data stored on one or more computer-readable storage devices or received from other sources.

The terms "computing device", "component" or "data processing apparatus" or the like encompass various apparatuses, devices, and machines for processing data, including by way of example a programmable processor, a computer, a system on a chip, or multiple ones, or combinations of the foregoing. The apparatus can include special purpose logic circuitry, e.g., an FPGA (field programmable gate array) or an ASIC (application specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, app, script, or code) can be written in any form of programming language, including compiled or interpreted languages, declarative or procedural languages, and can be deployed in any form, including as a stand-alone program or as a module, component, subroutine, object, or other unit suitable for use in a computing environment. A computer program can correspond to a file in a file system. A computer program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatuses can also be implemented as, special purpose logic circuitry, e.g., an FPGA (field programmable gate array) or an ASIC (application specific integrated circuit). Devices suitable for storing computer program instructions and data can include non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

The subject matter described herein can be implemented in a computing system that includes a back end component, e.g., as a data server, or that includes a middleware component, e.g., an application server, or that includes a front end component, e.g., a client computer having a graphical user interface or a web browser through which a user can interact with an implementation of the subject matter described in this specification, or a combination of one or more such back end, middleware, or front end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks). The controller 108, or devices associated with the controller 108, can communicate via a network. The network can include any of the mediums of digital data communications. For example, the network can host communication between components of the system 100, or with components communicatively coupled thereto.

While operations are depicted in the drawings in a particular order, such operations are not required to be performed in the particular order shown or in sequential order, and all illustrated operations are not required to be performed. Actions described herein can be performed in a different order.

Having now described some illustrative implementations, it is apparent that the foregoing is illustrative and not limiting, having been presented by way of example. In particular, although many of the examples presented herein involve specific combinations of method acts or system elements, those acts and those elements may be combined in other ways to accomplish the same objectives. Acts, elements and features discussed in connection with one implementation are not intended to be excluded from a similar role in other implementations or implementations.

The phraseology and terminology used herein is for the purpose of description and should not be regarded as limiting. The use of "including" "comprising" "having" "containing" "involving" "characterized by" "characterized in that" and variations thereof herein, is meant to encompass the items listed thereafter, equivalents thereof, and additional items, as well as alternate implementations consisting of the items listed thereafter exclusively. In one implementation, the systems and methods described herein consist of one, each combination of more than one, or all of the described elements, acts, or components.

Any references to implementations or elements or acts of the systems and methods herein referred to in the singular may also embrace implementations including a plurality of these elements, and any references in plural to any implementation or element or act herein may also embrace implementations including only a single element. References in the singular or plural form are not intended to limit the presently disclosed systems or methods, their components, acts, or elements to single or plural configurations. References to any act or element being based on any information, act or element may include implementations where the act or element is based at least in part on any information, act, or element.

Any implementation disclosed herein may be combined with any other implementation or embodiment, and references to "an implementation," "some implementations," "one implementation" or the like are not necessarily mutually exclusive and are intended to indicate that a particular feature, structure, or characteristic described in connection with the implementation may be included in at least one implementation or embodiment. Such terms as used herein are not necessarily all referring to the same implementation. Any implementation may be combined with any other implementation, inclusively or exclusively, in any manner consistent with the aspects and implementations disclosed herein.

References to "or" may be construed as inclusive so that any terms described using "or" may indicate any of a single, more than one, and all of the described terms. References to at least one of a conjunctive list of terms may be construed as an inclusive OR to indicate any of a single, more than one, and all of the described terms. For example, a reference to "at least one of 'A' and 'B'" can include only 'A', only 'B', as well as both 'A' and 'B'. Such references used in conjunction with "comprising" or other open terminology can include additional items.

Where technical features in the drawings, detailed description or any claim are followed by reference signs, the reference signs have been included to increase the intelligibility of the drawings, detailed description, and claims. Accordingly, neither the reference signs nor their absence have any limiting effect on the scope of any claim elements.

Modifications of described elements and acts such as variations in sizes, dimensions, structures, shapes and proportions of the various elements, values of parameters, mounting arrangements, use of materials, colors, orientations can occur without materially departing from the teachings and advantages of the subject matter disclosed herein. For example, elements shown as integrally formed can be constructed of multiple parts or elements, the position of elements can be reversed or otherwise varied, and the nature or number of discrete elements or positions can be altered or varied. Other substitutions, modifications, changes and omissions can also be made in the design, operating conditions and arrangement of the disclosed elements and operations without departing from the scope of the present disclosure.

For example, descriptions of positive and negative electrical characteristics may be reversed. For example, the voltages of the DC link can be inverted according to a designation or layout of the circuit. Elements described as negative elements can instead be configured as positive elements and elements described as positive elements can instead by configured as negative elements. For example, elements described as having first polarity can instead have a second polarity, and elements described as having a second polarity can instead have a first polarity. Further relative parallel, perpendicular, vertical or other positioning or orientation descriptions include variations within +/−10% or +/−10 degrees of pure vertical, parallel or perpendicular positioning. References to "approximately," "substantially" or other terms of degree include variations of +/−10% from the given measurement, unit, or range unless explicitly indicated otherwise. Coupled elements can be electrically, mechanically, or physically coupled with one another directly or with intervening elements. Scope of the systems and methods described herein is thus indicated by the appended claims, rather than the foregoing description, and changes that come within the meaning and range of equivalency of the claims are embraced therein.

What is claimed is:

1. A system, comprising:
    a switching component electrically connected with, and intermediary to, an electric motor of an electric vehicle and a capacitor of the electric vehicle; and
    a controller to cause the switching component to:
        enter a first state to cause the electric motor to convert electrical power of the capacitor to mechanical power to propel the electric vehicle, or convert mechanical power from a drive system of the electric vehicle to electrical power to charge the capacitor; and
        enter, in response to detection by the controller of an indication to discharge the capacitor, a second state to isolate the electric motor from the capacitor.

2. The system of claim 1, comprising:
    a sensor to detect a condition indicative of a call to discharge the capacitor, and provide the indication to discharge the capacitor.

3. The system of claim 1, wherein:
    the electric motor comprises a multi-phase AC motor, and
    the switching component comprises a plurality of switches to interconnect a plurality of phases of the multi-phase AC motor to an inverter in the first state and to each other in the second state.

4. The system of claim 1, comprising the controller to:
determine an elapsed time based on the indication to discharge the capacitor; and
cause the switching component to switch, based on the elapsed time, from the second state to the first state.

5. The system of claim 1, comprising:
a sensor to receive an indication of a completion of the discharge;
wherein the indication of the completion of the discharge is responsive to at least one vehicle condition comprising a speed or position of one or more components of the electric vehicle.

6. The system of claim 1, comprising:
the controller to inject current into the electric motor within a thermal operation envelop upon determining that a voltage of the capacitor exceeds a threshold, or engage the switching component upon determining that the voltage does not exceed the threshold.

7. The system of claim 1 comprising:
the capacitor to withstand a voltage in excess of 60 volts during the first state.

8. The system of claim 1, comprising:
an energy storage device electrically connected to at least one pole of a battery contactor; and
the battery contactor to disconnect the energy storage device from the capacitor, responsive to the indication to discharge the capacitor.

9. The system of claim 1, comprising:
a voltage sensor to determine that a voltage of the capacitor exceeds a threshold; and
the controller to, responsive to the determination that the voltage of the capacitor exceeds the threshold, inject current into the electric motor within a thermal operation envelope.

10. The system of claim 1, comprising:
the controller to store a state in memory comprising one of the first state or the second state; and
an interface to receive a command from a user to transition between the first state and the second state.

11. The system of claim 1, comprising:
a sensor to detect a condition indicative of a call to discharge the capacitor;
an inverter to supply power between the electric motor and the capacitor;
an inverter status indicator to store a state of the inverter; and
the controller to disengage the inverter status indicator, responsive to a determination of one or more operating parameters associated with the inverter or the electric motor.

12. A method, comprising:
receiving, by a system, an indication of a voltage of a capacitor;
comparing, by the system, the voltage of the capacitor to a threshold;
determining, by the system, that the threshold exceeds the voltage of the capacitor; and
engaging, by the system, a switching component to switch a propulsion component between a first state and a second state;
wherein the propulsion component:
in the first state, converts between electrical and mechanical energy; and
in the second state, converts from electrical or mechanical energy to thermal energy.

13. The method of claim 12, wherein:
the propulsion component comprises a multi-phase AC motor; and
a plurality of phases of the multi-phase AC motor are connected to each other in the second state.

14. The method of claim 12, comprising:
detecting, by the system, an indication to discharge the capacitor; and
wherein the threshold is 60 volts DC.

15. The method of claim 12, comprising:
opening a battery contactor, responsive to the indication to discharge the capacitor wherein:
the battery contactor connects an energy storage device to the capacitor; and
the energy storage device includes a battery.

16. The method of claim 12, wherein the propulsion component comprises a plurality of electric motors and a plurality of inverters.

17. A non-transitory computer readable media comprising instructions that, when executed by a processor of a system, cause the system to:
detect an indication to discharge a capacitor;
detect an indication of a voltage of the capacitor;
compare the voltage of the capacitor to a threshold;
determine whether the threshold exceeds the voltage of the capacitor, and, responsive to the determination:
engage a first switching component to switch a multi-phase AC motor between a first state and a second state upon determining that the voltage exceeds the threshold; or
inject current into the multi-phase AC motor within a thermal operation envelop upon determining that the voltage does not exceed the threshold; wherein
the multi-phase AC motor converts between electrical and mechanical energy in the first state; and
a plurality of phases of the multi-phase AC motor are connected to each other in the second state.

18. The non-transitory computer readable media of claim 17 wherein the threshold is at least 60 volts DC.

19. The non-transitory computer readable media of claim 17, comprising the instructions to:
open a battery contactor, responsive to the indication to discharge the capacitor, to decouple an energy storage device from the capacitor.

20. The non-transitory computer readable media of claim 17, comprising the instructions to:
latch one of the first state or the second state; and
transition between the first state and the second state, responsive to a command from a user interface.

* * * * *